United States Patent
Hsu (10) Patent No.: US 9,439,112 B2
(45) Date of Patent: Sep. 6, 2016

(54) LOW OVERHEAD MOBILITY IN LOCAL AREA WIRELESS NETWORK

(71) Applicant: MEDIATEK, INC., Hsin-Chu (TW)

(72) Inventor: Chia-Chun Hsu, New Taipei (TW)

(73) Assignee: MEDIATEK, INC., Hsin-Chu (TW)

( * ) Notice: Subject to any disclaimer, the term of this patent is extended or adjusted under 35 U.S.C. 154(b) by 221 days.

(21) Appl. No.: 14/165,833

(22) Filed: Jan. 28, 2014

(65) Prior Publication Data

US 2014/0220974 A1 Aug. 7, 2014

Related U.S. Application Data (60) Provisional application No. 61/759,503, filed on Feb. 1, 2013.

(51) Int. Cl.
| | | |
|---|---|---|
| *H04W 36/00* | (2009.01) | |
| *H04W 24/10* | (2009.01) | |
| *H04W 36/30* | (2009.01) | |
| *H04W 84/04* | (2009.01) | |

(52) U.S. Cl.
CPC ......... *H04W 36/0088* (2013.01); *H04W 24/10* (2013.01); *H04W 36/0055* (2013.01); *H04W 36/30* (2013.01); *H04W 84/045* (2013.01)

(58) Field of Classification Search
CPC ... H04W 24/10; H04W 36/08; H04W 36/14; H04W 36/30
USPC ........................................................ 455/436
See application file for complete search history.

(56) References Cited

U.S. PATENT DOCUMENTS

| | | | |
|---|---|---|---|
| 2011/0044292 A1* | 2/2011 | Eravelli ............ | H04W 36/0055 370/332 |
| 2011/0300807 A1 | 12/2011 | Kwun et al. ................. | 455/63.1 |
| 2012/0115541 A1* | 5/2012 | Suga ..................... | H04W 36/22 455/525 |
| 2013/0165130 A1 | 6/2013 | Wu et al. ....................... | 455/444 |
| 2013/0229939 A1* | 9/2013 | Teyeb ................... | H04W 36/30 370/252 |
| 2014/0004863 A1 | 1/2014 | Zhang et al. ................. | 455/444 |
| 2014/0200001 A1* | 7/2014 | Song ................ | H04W 36/0094 455/436 |

FOREIGN PATENT DOCUMENTS

| | | |
|---|---|---|
| CN | 102348244 A | 8/2010 |
| CN | 102469557 A | 11/2010 |
| WO | WO2012166975 A1 | 6/2011 |

OTHER PUBLICATIONS

International Search Report and Written Opinion of International Search Authority for PCT/CN2014/071758 dated May 8, 2014 (12 pages).

(Continued)

*Primary Examiner* — Khalid Shaheed
(74) *Attorney, Agent, or Firm* — Imperium Patent Works; Zheng Jin; Mark Marrello (57) ABSTRACT

In a heterogeneous network, enhanced handover and reestablishment procedures are proposed within a local area network. The enhanced procedures are more efficient, e.g., with less signaling and less data interruption than the legacy mobility mechanism. In a local area network, a UE is served by an anchor eNB in macro cell layer and one or more drift eNBs in small cell layer. When the UE moves within the local area network, the UE anchor does not need to change. For cell change within the same anchor, the enhanced procedures reduces signaling overhead and data interruption time.

24 Claims, 6 Drawing Sheets

(56) References Cited

OTHER PUBLICATIONS

EPO, Search Report for the EP patent application 14746862.3 dated Oct. 30, 2015 (11 pages).

3GPP TSG-RAN WG2 Meeting #81 R2-130513, Fujitsu, Discussion of Issues in Small Cell Deployments, St. Julian's, Malta dated Jan. 28-Feb. 1, 2013 (6 pages).

3GPP TSG-RAN2 Meeting #81 R2-130135, ZTE Corp., mobility Enhancement for Small Cell, St. Julian's, Malta dated Jan. 28-Feb. 1, 2013 (8 pages).

3GPP TSG-RAN2 #81 Meeting R2-130283, Mediatek Inc., Mobility Issues for Small Cell Deployment, St. Julian's, Malta dated Jan. 28-Feb. 1, 2013 (4 pages).

* cited by examiner

CELL CHANGE WITH ENHANCED HANDOVER – EMBODIMENT 1

FIG. 3

CELL CHANGE WITH ENHANCED HANDOVER – EMBODIMENT 2

FIG. 4

CELL CHANGE WITH ENHANCED RE-ESTABLISHMENT

LOW OVERHEAD MOBILITY IN LOCAL AREA WIRELESS NETWORK

CROSS REFERENCE TO RELATED APPLICATIONS

This application claims priority under 35 U.S.C. §119 from U.S. Provisional Application No. 61/759,503, entitled "Low Overhead Mobility in Local Area Wireless Network", filed on Feb. 1, 2013, the subject matter of which is incorporated herein by reference.

TECHNICAL FIELD

The disclosed embodiments relate generally to mobility management, and, more particularly, to enhanced handover and re-establishment with low overhead in small cell networks.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Under mobility management, when a connected UE moves within the E-UTRAN, the network needs to perform handover (HO) if the serving cell become worse than a threshold or a target cell is better than a threshold or better than the serving cell. Handover mechanism guarantees the user experience in a well-deployed network.

To greatly increase the system capacity, LTE has introduced cells with smaller coverage. Comparing to normal macro cell, these small cells transmit at smaller power and has smaller footprint. Dense deployment of small cells can bring cells close to users and therefore user can enjoy higher throughput. A network deploys macro cell and small cell in mixed ways is called a heterogeneous network (HetNet). Although small cell deployment can boost capacity, it also affects mobility. With more frequent cell change, legacy mobility mechanism would create more signaling on control plane and longer interruption on user plane, which would take away the benefit that small cell has promised.

In legacy LTE RAN, eNB change has to go through complete full handover procedure. With small cell deployment, smaller coverage would increase handover frequency. If there is no mobility enhancement, it means that every small cell change, network and UE has to go through full-scale handover procedure. The problems are twofold. First, frequency full-scale handover causes network and core network signaling storm. Every handover must go through seven signaling (between eNB/UE and eNB/eNB). If the handover were not properly finished, more signaling would be generated for RRC connection reestablishment or RRC connection request. With similar number of UE and mobility pattern, more handover is triggered within small cell deployment and therefore more signaling, which means more radio resource and processing power is consumed by mobility management. These additional signaling has a toll on network capacity. Frequent inter-node UE context transfer and core network signaling also put a pressure on X2/S1 backhaul and on MME/S-GW. Second, frequent full-scale handover causes longer data interruption. During handover, UE has to establish physical connection and reset L2 interface, which takes time. In addition, the network has to switch the data path, which has certain delay. Frequent handover means frequent data interruption, and further means higher chance of data loss. Data interruption and data loss deteriorates user experience.

To offset the negative impact, the network can group nearby small cells together to form a local (wireless) area network. Such local area network can also be linked to the overlaid macro cell. It is desirable that the mobility within the local area network has high efficiency, e.g. less signaling and small interruption. As a result, user can enjoy the high capacity that small cell deployment has promised without the burden of increased overhead. A solution for low overhead mobility in local area wireless network is sought.

SUMMARY

In a heterogeneous network, enhanced handover and reestablishment procedures are proposed within a local area network. The enhanced procedures are more efficient, e.g., with less signaling and less data interruption than the legacy mobility mechanism. In a local area network, a UE is served by an anchor eNB in macro cell layer and one or more drift eNBs in small cell layer. When the UE moves within the local area network, the UE anchor does not need to change. The UE anchor can be referred as "S1 anchor" and "Uu anchor" because it acts as the S1 terminator of the UE and has the UE context.

In one embodiment of enhanced handover procedure, a UE establishes an RRC connection with its anchor eNB. The UE is also served by a source drift eNB in a source small cell. The UE then receives measurement configuration from the anchor eNB or from the source drift eNB. The measurement configuration controls UE measurements and reporting frequency. When measurement reporting is triggered upon poor measurement results on the source small cell, the UE transmits a measurement report to the anchor eNB, which makes a handover decision. In one novel aspect, the UE sends a cell change request to the anchor eNB through the measurement report. The anchor eNB then performs the cell change within the same anchor without full-scale handover signaling.

In one embodiment of enhanced reestablishment procedure, a UE establishes an RRC connection with its anchor eNB. The UE is also served by a source drift eNB in a source small cell. The UE then receives measurement configuration from the anchor eNB or from the source drift eNB. Based on measurement results, the UE determines whether a target drift eNB is feasible for anchor-drift pairing. If so, then the UE may perform an enhanced RRC connection reestablishment procedure with the target eNB if a measurement report is triggered or if a condition for cell change within the same anchor is met. The UE transmits an RRC reestablishment request to the target eNB. The request comprises anchor eNB information such that the target eNB can recognize the anchor eNB for anchor-drift pairing. The enhanced reestablishment procedure is used for cell change within the same anchor without full-scale handover signaling.

The anchor eNB and the UE together shall try to identify opportunities for anchor-drift pairing, e.g., measurement configuration, and once the opportunity is identified, UE sends proper indication to anchor to trigger follow up action. From the network perspective, the anchor eNB can provide a list of cells that is possible for anchor-drift pairing to the UE. In addition, the anchor eNB can pre-prepare the list of cells under its control by forwarding UE context information, and pre-prepare the list of cells for shortMAC-I check for enhanced reestablishment request. To reduce security signaling, the network does not change the security key for small cell change within the same anchor.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 illustrates a small cell network with enhanced low overhead mobility management in accordance with one novel aspect. FIG. 2 also shows a simplified block diagram of a user equipment (UE) in accordance with one novel aspect.

DETAILED DESCRIPTION

Reference will now be made in detail to some embodiments of the invention, examples of which are illustrated in the accompanying drawings.

In 3GPP Long-Term Evolution (LTE) Rel-12 and after, besides normal base stations, small base stations with low transmission power and simplified protocol stacks and functionalities are introduced into E-UTRAN, which is referred to as small cell networks. The small cell architecture can be used to enhance the data throughput and to reduce the mobility signaling overhead. Instead of distributed operation, it is believed that an anchor-based architecture is a promising architecture to be operated in the small cell network.

Figure 1:
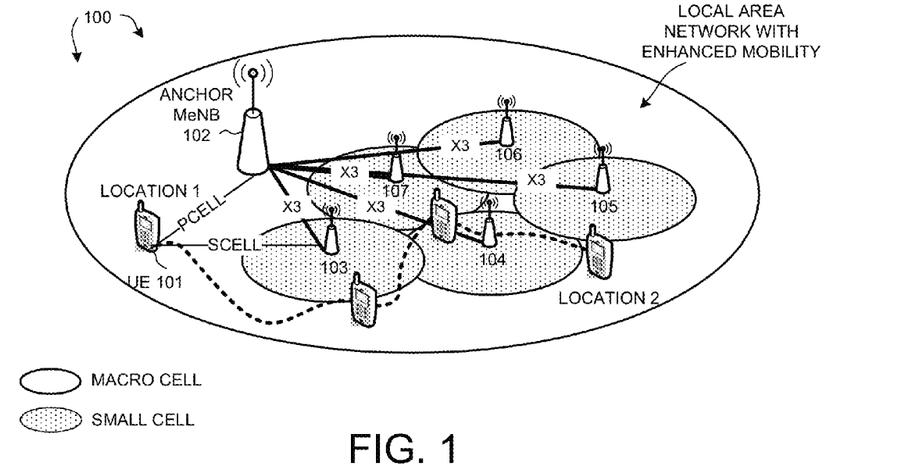
FIG. 1 illustrates a small cell network with user equipment (UE) anchor-based architecture in accordance with one novel aspect.

FIG. 1 illustrates a small cell network 100 with user equipment (UE) anchor-based architecture in accordance with one novel aspect. Small cell network 100 comprises UE 101, anchor eNB 102, and a plurality of drift eNBs 103-107. In UE anchor-based structure, UE anchor is UE specific, a UE anchor is a point where the Core Network connection of the UE is terminated, that does not have to be relocated when the UE moves in a local area covered by cells of multiple base-stations. In the example of FIG. 1, UE 101 is housed in anchor eNB 102, which is referred to as an anchor eNB of the UE. Anchor eNB is also referred to as Macro eNB (MeNB). UE anchor can be relocated to another eNB by handover. For example, UE 101 may handover to another anchor eNB when UE 101 moves from location 1 to location 2. UE serving cell(s) can be controlled by drift eNB 103 that is different from anchor eNB 102, which is referred to as a drift eNB of the UE. Drift eNB is also referred to as Secondary eNB (SeNB). The Anchor-Drift concept is only applicable to UEs in RRC connected mode. As illustrated in FIG. 1, UE 101 establishes an RRC connection with anchor eNB 102 over a primary serving cell (e.g., PCELL is a macro cell served by anchor MeNB 102), while served by one or more drift eNBs over secondary serving cells (e.g., SCELL is a small cell served by drift SeNB 103).

Since a drift eNB and an anchor eNB may not be physically collocated, there should be transmission medium and interface between the anchor eNB and the drift eNB. Assume X3 interface is introduced for communications between the anchor eNB and the drift eNB. From real deployment perspective, it cannot always assume the ideal backhaul connections, e.g., optical fiber, exist between the anchor eNB and the drift eNB. To avoid the backhaul delay and overhead due to the information exchange between the anchor eNB and the drift eNB and to improve the flexibility and efficiency of scheduling, an independent scheduler should be located in each drift eNB (assume the anchor eNB has its own scheduler originally). In that case, the protocol stack in the drift eNB should at least include Physical layer and MAC layer.

In 3GPP, a term "dual connectivity" is defined, which is used to refer to operation where a given UE consumes radio resources provided by at least two different network points connected with non-ideal backhaul. The control plane and user plane are also redefined in the small cell architecture for UEs with dual connectivity. For example, when UE 101 is served by both anchor eNB 102 and drift eNB 103, the control of UE 101 and the user plane functionality is split between anchor eNB 102 and drift eNB 103. For control plane, the RRC layer signaling may be performed mainly by the anchor eNB, with the drift eNB providing certain assistance. For user plane, the S1-U may be terminated in both anchor and drift eNB or only terminated in the anchor eNB.

For mobility management, in legacy LTE radio access network (RAN), eNB change has to go through complete full handover procedure. With small cell deployment, smaller coverage would increase handover frequency. Therefore, it is desirable to have a low overhead handover mechanism, i.e., less signaling and shorter interruption. Low overhead handover has the following requirements. First, it has relatively less RRC signaling during handover. Second, it has relatively less or no core network signaling (S1 signaling) during handover. Third, it has shorter data interruption during handover. In one novel aspect, an enhanced mobility mechanism is proposed to reduce signaling overhead and data interruption with small cell deployment. As illustrated in FIG. 1, nearby small cells are grouped together to form a local area network, which also contains the overlaid macro cell. As the local area network and the anchor/drift concept is introduced, the enhanced mobility mechanism, i.e. enhanced handover and re-establishment, is proposed within the local area network, which is more efficient, e.g. less signaling and less interruption, than the legacy mobility mechanism.

Figure 2:
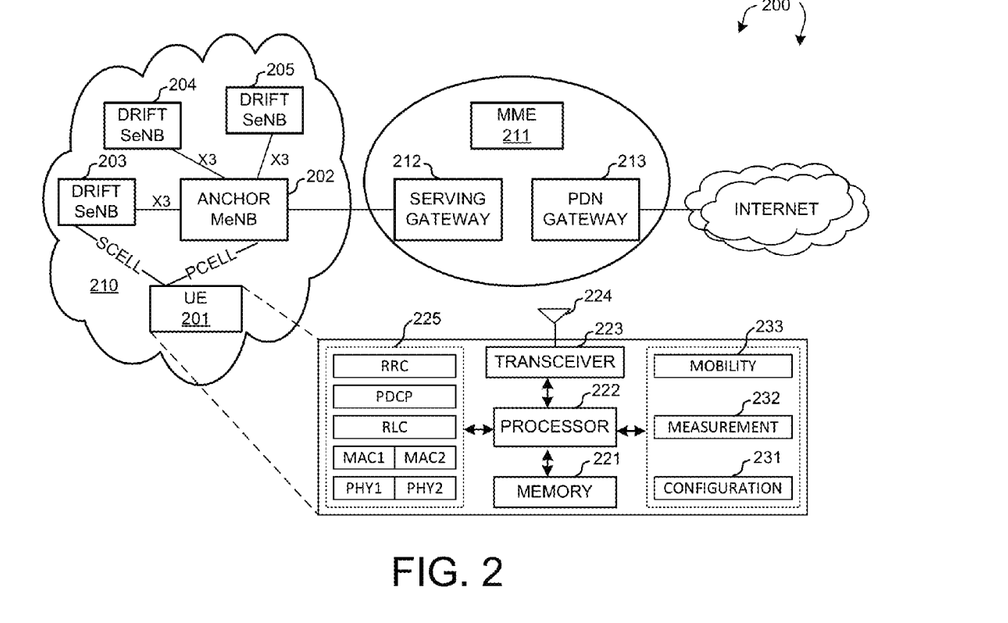

FIG. 2 illustrates a small cell network 200 with enhanced low overhead mobility management in accordance with one novel aspect. Small cell network 200 comprises UE 201, an anchor/macro MeNB 202 for UE 201, a plurality of drift/secondary SeNBs 203-205, a mobility management entity MME 211, a serving gateway 212, a PDN gateway 213, and the Internet. UE 201 is served by anchor/macro MeNB 202 and one or more drift/secondary SeNBs 203-205. The anchor eNB and nearby drift eNBs form a local area network 210 providing radio access for UE 201. MME 211, serving gateway 212, and PDN gateway 213 form part of the core network. Under mobility management, when UE 201 moves within the RAN, the network needs to perform handover if the serving cell become worse than a threshold or a target cell is better than a threshold or better than the serving cell. Although small cell deployment can boost capacity, smaller coverage would increase handover frequency. With more frequent cell change, legacy mobility mechanism would create more signaling on control plane and longer interruption on user plane, which would take away the benefit that small cell has promised.

In one novel aspect, to achieve less core network signaling, an anchor/macro eNB is introduced to a UE in heterogeneous network. As illustrated in FIG. 2, the idea is that within a local area, UE 201 has one anchor/macro MeNB 202, which does not need to change if UE 201 moves within the local area network 210. In other words, a specific eNB is acted as the S1 termination of the UE, which can be referred as "S1 anchor". The size of a local area does not need to be fixed and totally up to network implementation. For different UEs, the corresponding local area network could be different. Therefore, as long as a UE does not need to change its anchor/macro eNB, it is in the same local area network. Similar concept can also be used to achieve less inter-node context transfer. A specific eNB has the UE context, which can be referred as "Uu anchor". Therefore, within the local area network, the UE context does not need to move frequently or partial move is sufficient.

FIG. 2 also shows a simplified block diagram of a user equipment UE 201 in accordance with one novel aspect. UE 201 comprises memory 221, a processor 222, an RF transceiver 223 coupled to antenna 224, a protocol stack 225, and various function modules to perform various functionalities of the UE. When UE 201 establishes a radio resource control (RRC) to a radio access network via its anchor/macro MeNB 202, a primary cell (PCELL) will be configured to UE 201 by MeNB 202, where the associated PHY, MAC, RLC and PDCP entities should be established in the UE side, responsible for the control and data transmission and reception through MeNB 202. In the UE anchor-based architecture, the cell addition, modification, and release procedure in the drift/secondary SeNB (e.g., SeNB 203) can apply the same procedure as it in carrier aggregation, i.e., PCELL change through RRC connection reconfiguration with mobility control information and SCELL change through RRC connection reconfiguration without mobility control information.

In the example of FIG. 2, when the PCELL in anchor MeNB 202 is configured for UE 201, the corresponding PHY sublayer (e.g., PHY1) is initialized and one MAC entity (e.g., MAC1), and/or RLC entities and PDCP entities should be established in the UE side, responsible for data transmission and reception through anchor MeNB 202. Later on, when an SCELL by drift SeNB 203 is configured to UE 201, the corresponding PHY sublayer (e.g., PHY2) is initialized and one MAC entity (e.g., MAC2), and/or RLC entities and PDCP entities should be established in the UE side, responsible for data transmission and reception through drift SeNB 203, where the new MAC2 entity should be enabled or to be set up corresponding to the SCELL. If a MAC entity is implemented by hardware, the functions of this MAC entity should be enabled and configured. If a MAC entity is implemented by software, the functions of this MAC entity should be added/configured.

Furthermore, the different function modules in UE 201 can be implemented by software, firmware, hardware, or any combination thereof. The function modules, when executed by the processor 222, allow UE 201 to perform various enhanced mobility mechanisms. For example, configuration module 231 receives configuration from the network (e.g., measurement configuration) and determines corresponding actions, measurement module 232 performs radio signal measurements and determines measurement reporting based on measurement configuration, and UE-based mobility module 233 performs enhanced mobility procedures. In general, it is desirable that cell change that does not involve anchor change can be enhanced so as to cell change will incur less inter-node UE context transfer and less core network signaling. There are two options for enhanced mobility mechanism. The first option is cell change with enhanced handover and the second option is cell change with enhance reestablishment.

Figure 3:
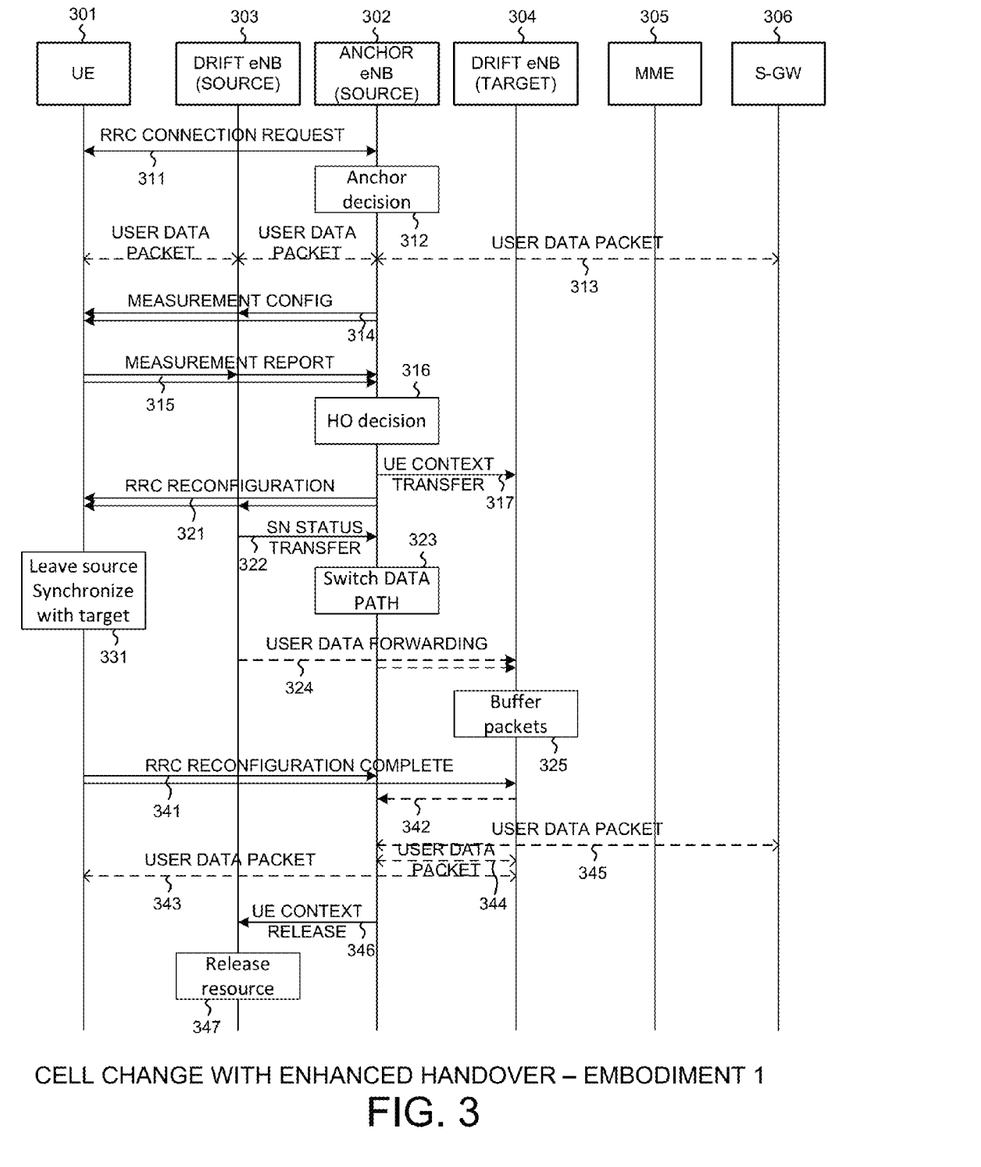
FIG. 3 illustrates one embodiment of cell change with enhanced handover procedure.

FIG. 3 illustrates one embodiment of cell change with enhanced handover procedure. In step 311, UE 301 sends an RRC connection request and establishes an RRC connection with source eNB 302. In step 312, the network determines that eNB 302 is the anchor for UE 301. The network can explicitly inform UE 301 the anchor decision via explicit signaling. The anchor decision can also be implicitly defined by specific RRC signaling, e.g., the cell that UE 301 sends RRC connection request, the cell that that UE 301 was asked to go to by legacy handover command, or the cell that security command is received by UE 301, is the primary serving cell served by UE anchor. In addition to anchor eNB 302, UE 301 may be served by additional drift eNBs, e.g., drift eNB 303, in additional source small cells. In step 313, UE 301 communicates user data packets with anchor eNB 302 and drift eNB 303 through the serving gateway S-GW 306.

Next, in step 314, UE 301 receives measurement configuration from anchor eNB 302. When UE 301 has dual connectivity, as depicted in FIG. 3, UE 301 can receive the measurement configuration from macro cell or from small cell. If handover is within the same anchor, then the anchor is able to decide a measurement configuration on the macro cell layer. On the small cell layer, the network is not well planned and UE autonomous discovery may be needed. In step 315, UE 301 performs measurements and sends measurement report if a measurement reporting triggering condition is met based on measurement results. For example, if the serving cell become worse than a threshold or a target cell is better than a threshold or better than the serving cell. The measurement report may be sent to anchor eNB 302 directly, or first sent to drift eNB 303 and then forwarded to anchor eNB 302.

In one novel aspect, the measurement configuration and reporting is enhanced for small cell deployment. Small cell deployment is to increase throughput. However, frequent measurements and reporting triggered by small cells might create signaling overhead with no benefit. In one example, when UE has high mobility, the network might not act on a measurement report for small cell. In another example, when UE does not have many data to transmit, a measurement report for small cell also seems not useful. In other words, whether to send a measurement report for small cell should be based on bandwidth demand or mobility of a UE. Network loading may be a factor for measurement reporting for small cell as well. For example, if the macro layer is congested, then the network may prefer UEs to search for small cell more aggressively, so it can disable all UE filtering on the measurement reporting for small cell.

Based on the above observation, in one embodiment, UE 301 is configured not to perform measurements, or performed with less frequency, or not to send measurement report when one or more of the following conditions are met in a small cell architecture. The conditions include 1) UE mobility is higher than a given threshold, e.g., physical speed, number of cell change within the predefined period; 2) UE user plane demand is less than a given threshold, e.g., buffered data is bigger than a threshold or data arrival rate is higher than a threshold; 3) UE does not have a data bearer that has a specific requirement, e.g., QoS or local breakout to private network, that is suitable for small cell transmission; and 4) network loading of the macro cell layer is higher than a given threshold, e.g., 1-bit information from the network to indicate that no UE filtering on the measurement reporting should be applied for small cells. In another embodiment, the measurement and reporting frequency of UE 301 is controlled by the network for the small cell layer through dedicated signaling and/or through broadcasting signaling, e.g., control information in the system information block (SIB). More specifically, the UE measurement frequency or measurement reporting frequency is based on at least one of a UE speed, a UE location, a UE access class, a UE traffic type, a UE traffic status, and a UE received signal quality from the macro cell layer.

In step 316, anchor eNB 302 makes handover decision based on the measurement report. If there is a need to change anchor (e.g., mobility on the macro cell layer), then anchor eNB 302 would apply legacy X2 handover procedure. On the other hand, if the same anchor can still be used, then anchor eNB 302 needs to transfer the UE context to a target eNB. For example, eNB 302 remains as UE anchor and decides to handover UE 301 from a source small cell served by drift eNB 303 to a target small cell served by another drift eNB 304. If the interface between anchor-drift eNB is a master-slave interface, then the anchor eNB informs the target eNB through UE context transfer directly. If the anchor-drift interface is like a legacy X2 interface, then the anchor eNB needs to negotiate with the target eNB whether it can be a drift eNB for the UE. In step 317, anchor eNB 302 transfers the UE context to the target drift eNB 304. Full UE context may not be needed if the target small cell is only responsible for physical layer configuration. Therefore, only physical layer-related information needs to be transferred to the target cell. The entire UE context information transfer can be omitted if the anchor eNB 302 is also responsible for physical layer configuration.

After HO decision, anchor eNB 302 sends a handover command (Drift SeNB change) to UE 301. In step 321, an RRC connection reconfiguration with mobility information is sent to UE 301 to trigger the cell change due to Drift SeNB change. SeNB addition/removal results in cell change on the small cell layer continues using the same C-RNTI. Enhanced SeNB addition/removal procedure can also be used for single connectivity UE on small cell layer or any layer if there exists an UE anchor in the network, i.e. UE context like C-RNTI is known at the anchor. The procedure is useful when there is an anchor that can provide UE context. Even when the UE does not connect to the anchor physically, as long as the serving/target knows which eNB the anchor is, the procedure would work fine. The whole point of introducing anchor is to hide mobility in the network, instead of impact the core network.

After the handover command is sent to UE 301 directly from anchor eNB 302 or through source eNB 303 to UE 301, source eNB 303 transfers SN status (the sequence number of the last transmitted packet) to target eNB 304 (step 322). The anchor eNB 302 then triggers data path switch (step 323), and both anchor eNB 302 and source eNB 303 start forwarding user data to target eNB 304 (step 324). Target eNB 304 buffers data before it can initiate transmission to UE 301 (step 325). At the UE side, UE 301 leaves the source cell and synchronizes with the target cell (step 331). More specifically, UE 301 prepares RRC connection reconfiguration complete and initiates a random access (RA) procedure with target eNB 304. If timing advance is not a concern in the target small cell, UE 301 can start to monitor for uplink grant. If SeNB addition/removal is used, then the same C-RNTI is used. If RRC connection reconfiguration with mobility information is used, then a new C-RNTI is used. Once UE 301 receives an uplink grant from target eNB 304, in step 341, it transmits handover complete confirmation (e.g., an RRC connection reconfiguration complete message) to target eNB 304 (or also to anchor eNB 302). Optionally, target eNB 304 may forward the handover complete confirmation to anchor eNB 302 in step 342.

After handover completion, UE 301 communicates user data packets with anchor eNB 302 and drift eNB 304 through serving gateway S-GW 306 (steps 343-345)). In step 346, anchor eNB 302 releases UE context information at the source cell. Anchor eNB 302 may explicitly signal source eNB 303 to trigger UE context release, or source eNB 303 may release UE context by a pre-defined timer. Finally, in step 347, source eNB 303 releases UE context. The handover procedure is then completed.

Figure 4:
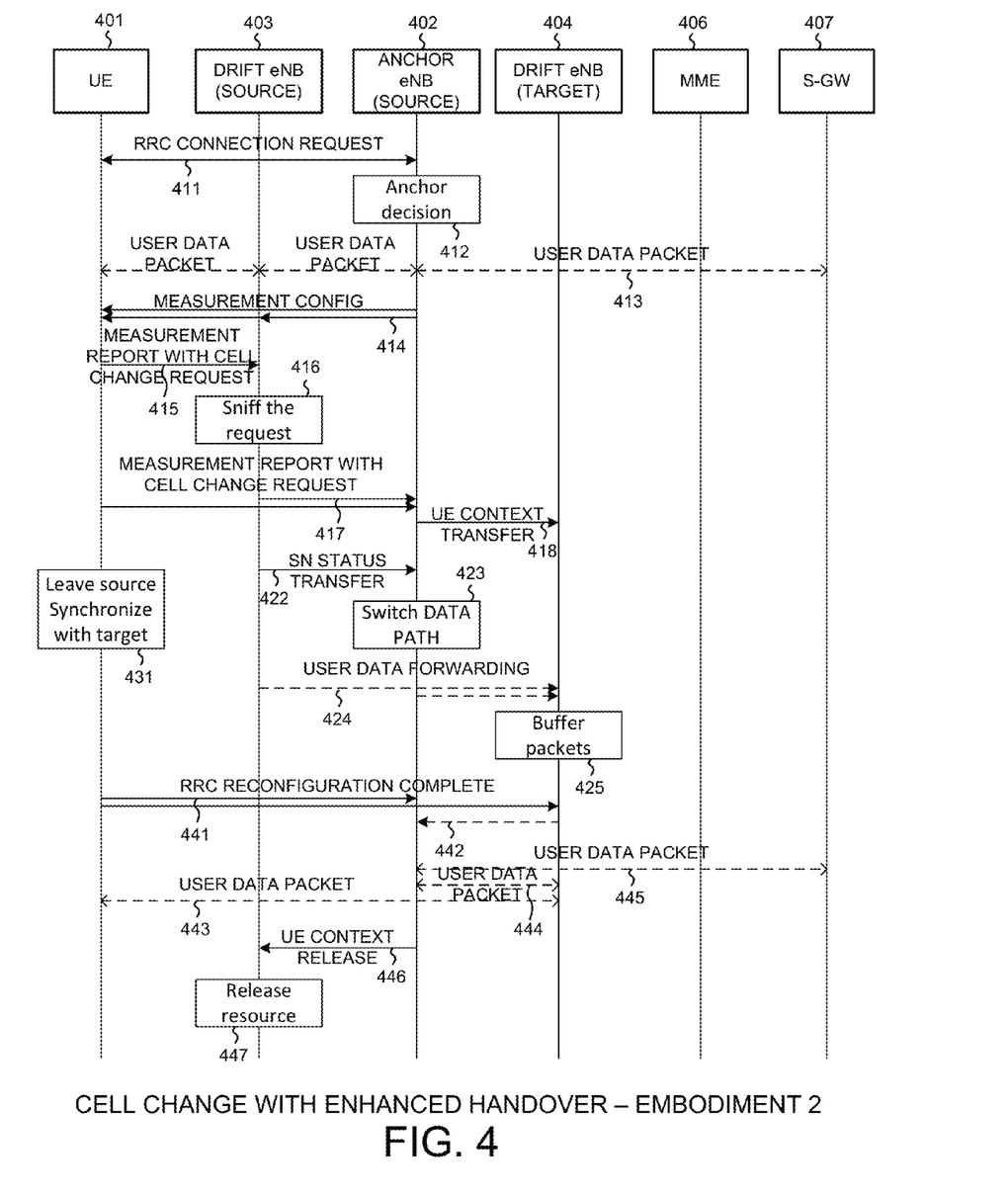
FIG. 4 illustrates another embodiment of cell change with enhanced handover procedure.

FIG. 4 illustrates another embodiment of cell change with enhanced handover procedure. The embodiment of FIG. 4 is similar to the embodiment of FIG. 3, except for the measurement-reporting step. Steps 411 to 414 in FIG. 4 are the same as steps 311 to 314 in FIG. 3. In step 415, a measurement reporting condition is triggered for measurement report. Instead of sending a measurement report to trigger a handover procedure, UE 401 sends a measurement report with a cell change request. In one example, a cell change request indication is carried with the measurement report. In another example, the measurement report itself is used as a cell change request. If UE 401 finds a preferred target cell, or the target cell has a special label, then the cell change is triggered and the cell change request indicates the preferred target cell. Upon receiving the measurement report, in step 416, source eNB 403 sniffs the cell change request and passes the measurement report with cell change request to anchor eNB 402 in step 417. Alternatively, the measurement report with cell change request may be sent by UE 401 to anchor eNB 402 directly in step 417. Because the cell change request indicates the target cell, in step 418, anchor eNB 402 transfers UE context to target eNB 404. In step 422, source eNB 403 transfers SN status to anchor eNB 402. In step 423, anchor eNB triggers data path switch. In step 424, source eNB 403 and anchor eNB 402 forward user data to target eNB 404. Target eNB 404 buffers data before it can initiate transmission to UE 401 (step 425). At the UE side, once UE 401 synchronizes with target eNB 404 in step 431, it sends an RRC reconfiguration complete to target eNB 404 in step 441 (or also to anchor eNB 402). The remaining of the cell change procedure is identical to the handover procedure illustrated in FIG. 3.

In can be seen that in this embodiment, UE 401 completes cell change without triggering legacy handover procedure. As compared to legacy handover, HO request, HO request ACK and HO command are no longer used to reduce signaling overhead. Furthermore, SeNB addition/removal can be used to trigger the cell change at small cell layer if UE 401 maintains dual connectivity on both macro cell layer and on small cell layer. In general, SeNB addition/removal has shorter interruption as compared to RRC connection reconfiguration of FIG. 3. The enhancements in this invention is to keep the mobility within the local area network (same anchor) signaling light and quicker (less interruption or no interruption).

Figure 5:
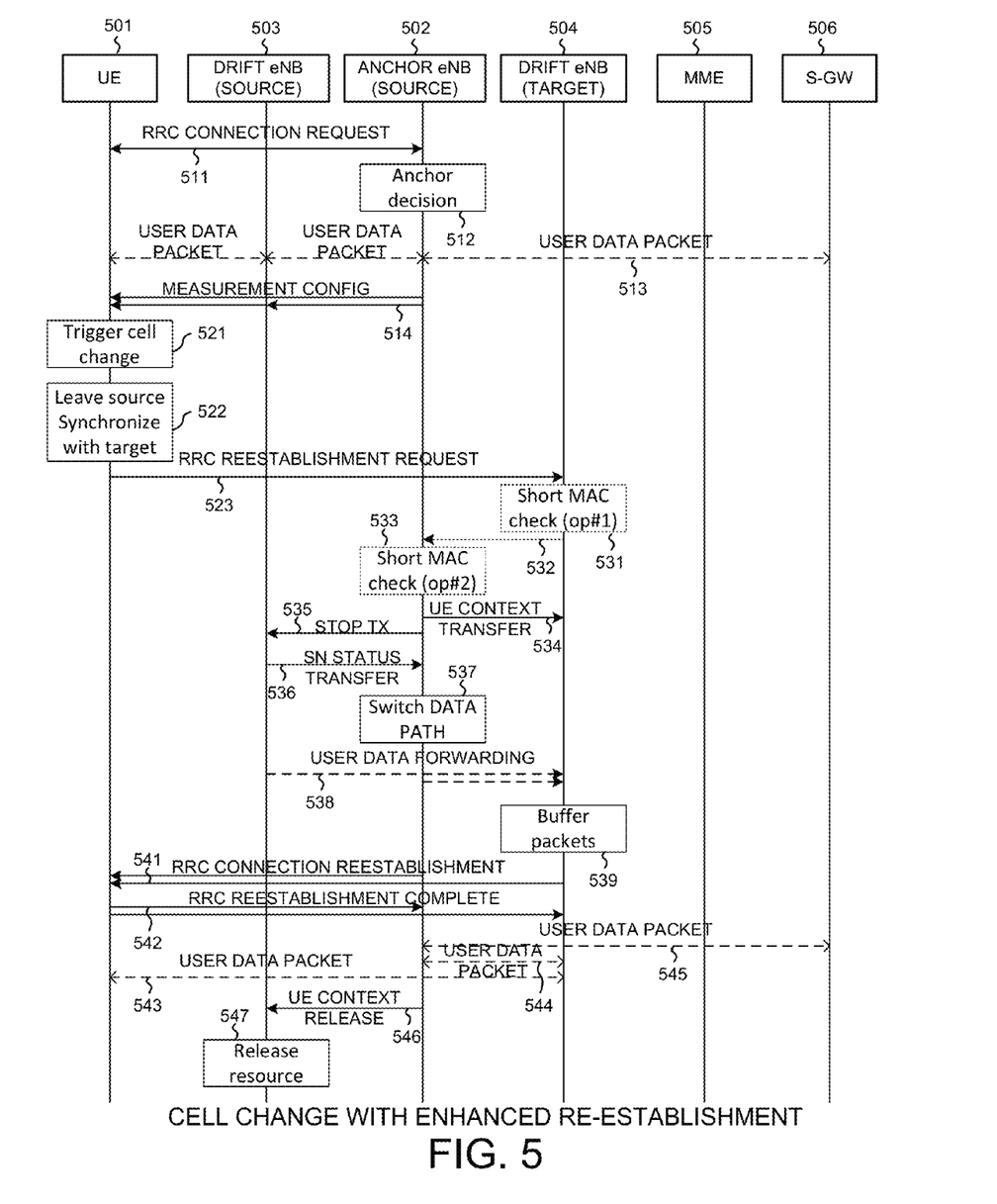
FIG. 5 illustrates one embodiment of cell change with enhanced reestablishment procedure.

FIG. 5 illustrates one embodiment of cell change with enhanced reestablishment procedure. Traditionally, reestablishment procedure is applied upon detecting a radio link failure (RLF) event. In accordance with one novel aspect, an enhance reestablishment procedure is applied for cell change within the same anchor to reduce signaling overhead. Steps 511 to 514 are the same as steps 311 to 314 in FIG. 3 and steps 411 to 414 in FIG. 4. UE 501 establishes an RRC connection with its anchor eNB 502 in macro cell layer, and is served in by drift eNB 503 in small cell layer. Upon receiving measurement configuration in step 514, UE 501 starts to perform measurements accordingly. If there is dual connectivity, UE 501 can receive the measurement configuration either form the macro cell or from the small cell.

In addition to legacy measurement configuration, to enable enhanced re-establishment, either UE itself or the network needs to have proper preparation or configuration. The UE needs to know the cells that the UE can initiate enhanced re-establishment to request anchor-drift pairing. In one option, anchor eNB 502 specifies the cells under its control. For example, a list of cells (PCI, GCI), a range of cell ID (PCI, GCI), and such information can be carried in the measurement configuration sent to UE 501. This option allows more flexible local area network configuration, and the configuration could be UE specific, e.g., according to UE speed/traffic. If the local area network is fixed (predefined or semi-statically defined), another option is each cell can broadcast its anchor information to all UEs. For example, UE 501 can read the broadcasted information to know whether a specific cell by drift eNB 504 is controlled by its anchor eNB 502. A cell can belong to multiple anchor, so there could be a list of anchor cells for each cell.

When measurement report has been triggered, or cell change within the same anchor has been met, UE 501 triggers cell change within the same anchor by initiating an enhanced reestablishment procedure. For example, a condition for cell change within the same anchor is met when the current small cell becomes worse than a first threshold, or a new small cell becomes better than a second threshold, or a new cell becomes better than the current small cell over a third threshold. The enhanced reestablishment allows UE to go to a target cell directly, instead of sending measurement report to source cell or anchor cell to trigger handover. The signaling overhead of sending measurement report is reduced and UE can trigger reestablishment to any small target cell within the same anchor. Additional filtering such as speed and traffic can be specified to make sure the enhanced reestablishment is triggered properly. In step 521, UE 501 triggers cell change from source eNB 503 to target eNB 504 (e.g., when signal quality in target cell is better than source cell) without sending any measurement report to source eNB 503. In step 522, UE 501 leaves the source cell and tries to synchronize with the target cell. While UE 501 synchronized to the target cell, UE 501 prepares RRC reestablishment request and initiates a random access (RA) procedure with target eNB 504.

In step 523, UE 501 sends an RRC reestablishment request to target eNB 504. In the RRC reestablishment request, UE 501 additionally includes its anchor information, e.g., PCI and frequency, CGI, or other ID that allows target eNB 504 to recognize the anchor of UE 501. As a result, target eNB 504 will be able to forward anchor-drift paring request to anchor eNB 502. In addition to the anchor information, legacy information, C-RNTI, PCI of the previous source cell, and short MAC-I are also included in the RRC reestablishment request. PCI of the previous source cell only exists if there is a need for anchor to switch data path and request UE context release (there is a source cell that the UE no longer connect to), otherwise, source cell information can be omitted. Furthermore, a new reestablishment cause can be used to inform the target eNB that the reestablishment request is for the purpose of "cell change within the same anchor", and therefore the target eNB should forward the request to the anchor for anchor-drift paring.

Upon reestablishment request is sent, target eNB 504 performs shortMAC-I check in step 531 (option #1). If the shortMAC-I matches, then target eNB 504 forwards the request to anchor eNB 502. Alternatively, in step 532, target eNB 504 forwards all the reestablishment information to anchor eNB 502 (option #2). As a result, the shortMAC-I check is performed by anchor eNB 502. This way, legacy shortMAC-I can be used. If source cell information is missing, then a default value, e.g., all "1", or anchor ID is used for shortMAC-I calculation. The original shortMAC-I is source-target cell pair specific, so source eNB 503 has to prepare potential target cell one by one. In accordance with one novel aspect, a new shortMAC-I with anchor as source cell can be defined. As a result, the anchor can pre-prepare neighbor cells or cells under the same anchor for the new shortMAC-I. The pre-prepared cell list matches the cell list provided in the measurement configuration to UE 501.

After shortMAC-I check, in step 534, anchor eNB 502 transfers UE context to target eNB 504. The anchor can also pre-forward UE context to the cells that enhanced reestablishment is allowed, e.g., cells listed in the measurement configuration. In accordance with one novel aspect, an anchor can pre-prepare all drift eNBs under its control when it becomes the anchor of a UE. As a result, the local area network can quickly configure the UE after receiving its cell change request. The main interruption time is the data path switch in the network. Furthermore, the anchor could trigger UE context release when the UE left the local area (change anchor). Once receives reestablishment request, anchor eNB 502 also begins to switch data path. First, in step 535, anchor eNB 502 sends session stop indication to the source cell to stop transmission, and source eNB 503 replies to anchor eNB 502 with SN status in step 536. Next, in step 537, anchor eNB 502 triggers data path switch. In step 538, source eNB 503 and anchor eNB 502 forward user data to target eNB 504. Target eNB 504 buffers data before it can initiate transmission to UE 501 (step 539).

After target eNB 504 has the UE context, target eNB 504 can then send an RRC connection reestablishment to UE 501 for dedicated configuration (step 541). In step 542, UE 501 replies to target eNB 504 with RRC reestablishment complete. Alternatively, anchor eNB 502 can send an RRC connection reestablishment to UE 501 in step 541, and UE 501 replies to anchor eNB 502 with RRC reestablishment complete in step 542. The remaining of the reestablishment procedure is then identical to the handover or cell change procedure illustrated in FIG. 3 or in FIG. 4. The enhance reestablishment procedure for cell change within the same anchor is then completed. Since the UE identity is known to the network, RRC connection can be transmitted in a security protected way. With security protection, cell change within the same anchor is more secured. To reduce security signaling, UE 501 does not need to change security key while in the same anchor, e.g., UE 501 does not need to update key while changing small cell, which is transparent to the core network.

Figure 6:
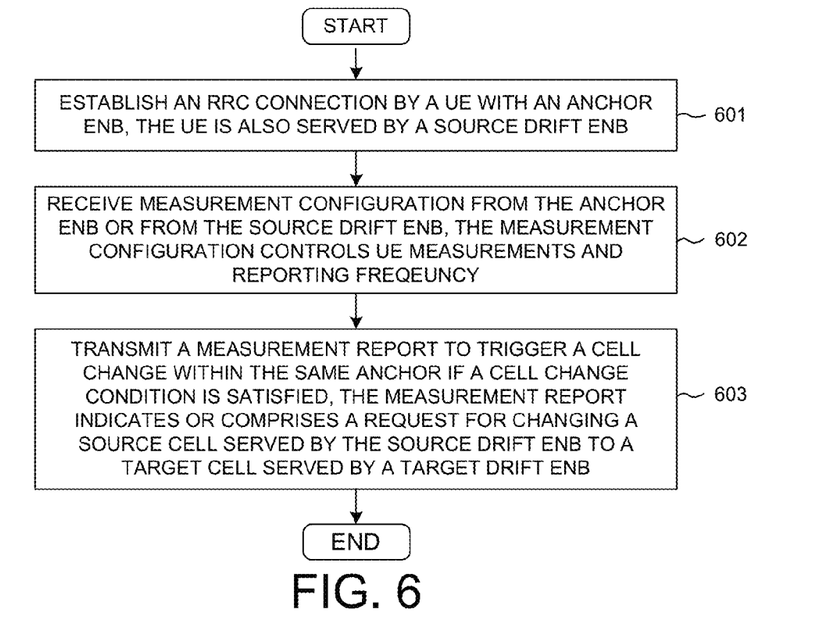
FIG. 6 is a flow chart of a method of enhanced handover from UE perspective in a small cell network in accordance with one novel aspect.

FIG. 6 is a flow chart of a method of enhanced handover from UE perspective in a small cell network in accordance with one novel aspect. In step 601, a UE establishes an RRC connection with its anchor eNB. The UE is also served by a source drift eNB in a source small cell. In step 602, the UE receives measurement configuration from the anchor eNB or from the source drift eNB. The measurement configuration controls UE measurements and reporting frequency. When measurement reporting is triggered upon poor measurement results on the source small cell, the UE transmits a measurement report to the anchor eNB, which makes a handover decision. In one novel aspect, in step 603, the UE transmits the measurement report to trigger a cell change within the same anchor if a cell change condition is met. The measurement report indicates or comprise a request for changing the source small cell to another target small cell. The anchor eNB then performs the cell change within the same anchor without full-scale handover signaling.

Figure 7:
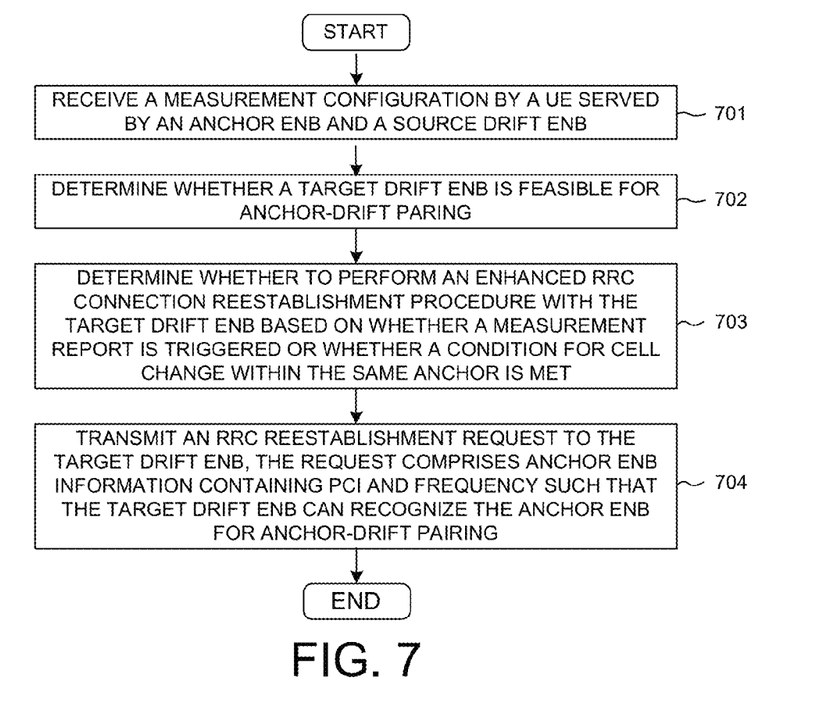
FIG. 7 is a flow chart of a method of enhanced reestablishment from UE perspective in a small cell network in accordance with one novel aspect.

FIG. 7 is a flow chart of a method of enhanced reestablishment from UE perspective in a small cell network in accordance with one novel aspect. In step 701, a UE establishes an RRC connection with its anchor eNB and receives a measurement configuration from the anchor eNB or a source drift eNB. In step 702, based on measurement results, the UE determines whether a target drift eNB is feasible for anchor-drift pairing. If so, in step 703, the UE may perform an enhanced RRC connection reestablishment procedure with the target eNB if a measurement report is triggered or if a condition for cell change within the same anchor is met. Finally, in step 704, the UE transmits an RRC reestablishment request to the target eNB. The request comprises anchor eNB information such that the target eNB can recognize the anchor eNB for anchor-drift pairing. The enhanced reestablishment procedure is used for cell change within the same anchor without full-scale handover signaling.

Figure 8:
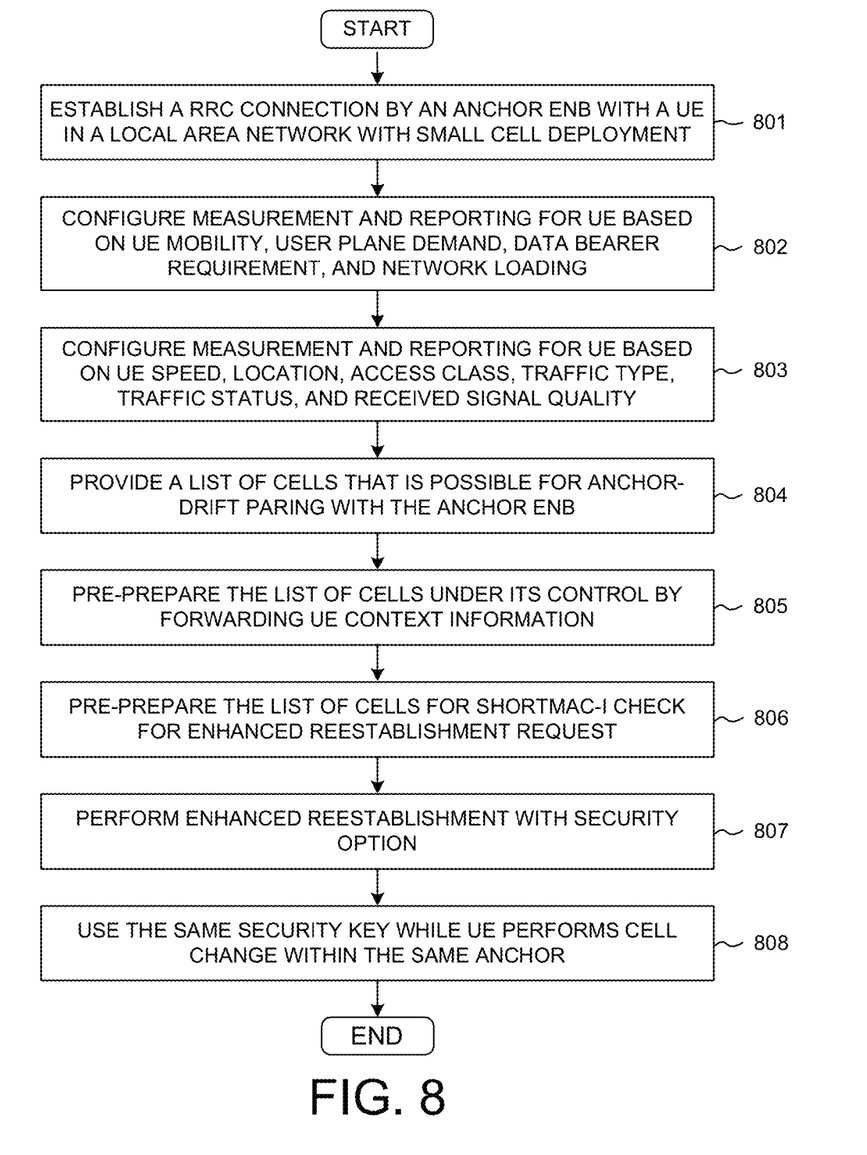
FIG. 8 is a flow chart of a method of low overhead mobility management from eNB perspective in a small cell network in accordance with one novel aspect.

FIG. 8 is a flow chart of a method of low overhead mobility management from eNB perspective in a small cell network in accordance with one novel aspect. In step 801, an anchor eNB establishes an RRC connection with a UE in a local area network with small cell deployment. In step 802, the anchor eNB configures measurement and reporting for the UE based on UE mobility, user plane demand, data bearer requirement, and network loading. In step 803, the anchor eNB configures measurement and reporting frequency based on UE speed, location, access class, traffic type, traffic status, and received signal quality. In step 804, the anchor eNB provides a list of cells that is possible for anchor-drift pairing with the anchor eNB, e.g., through measurement configuration. In step 805, the anchor eNB pre-prepares the list of cells under its control by forwarding UE context information. In step 806, the anchor eNB pre-prepares the list of cells for shortMAC-I check for enhanced reestablishment request. A target cell forwards the request to the anchor eNB only shortMAC-I matches. In step 807, the anchor eNB performs enhanced RRC connection reestablishment with security protection. In step 808, the anchor eNB uses the same security key while UE performs cell change within the same anchor.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a radio resource control (RRC) connection by a user equipment (UE) with an anchor base station (eNB) in a mobile communication network, wherein the UE is also served by a source drift eNB;
   receiving measurement configuration from the anchor eNB or from the source drift eNB, wherein the measurement configuration controls UE measurements and reporting frequency; and
   transmitting a measurement report to trigger a cell change within the same anchor if a cell change condition is satisfied, wherein the measurement report indicates or comprises a request for changing a source small cell served by the source drift eNB to a target small cell served by a target drift eNB, and wherein after the cell change the UE is connected with the anchor base station and the target drift eNB.

2. The method of claim 1, wherein the measurement configuration for UE measurements and reporting is based on at least one of a UE mobility, a UE user plane demand, a UE data bearer requirement, and a network loading of a macro cell layer.

3. The method of claim 1, wherein the measurement configuration for UE measurements and reporting frequency is based on at least one of a UE speed, a UE location, a UE access class, a UE traffic type, a UE traffic status, and a UE received signal quality.

4. The method of claim 1, wherein a handover is performed for cell change, the method further comprising:
   receiving an RRC reconfiguration request message from the anchor eNB;
   leaving the source cell and synchronizing with the target cell; and
   transmitting an RRC reconfiguration complete message to the target drift eNB.

5. The method of claim 1, wherein the cell change condition comprises the UE determines the target cell as a preferred cell within the same anchor.

6. The method of claim 5, further comprising:
   performing a drift eNB addition and removal procedure to change from the source small cell to the target small cell.

7. A user equipment (UE), comprising:
   a radio resource control (RRC) module that establishes an RRC connection with an anchor base station (eNB) in a mobile communication network, wherein the UE is also served by a source drift eNB;
   a receiver that receives measurement configuration from the anchor eNB or from the source drift eNB, wherein the measurement configuration controls UE measurements and reporting frequency; and
   a transmitter that transmits a measurement report to trigger a cell change within the same anchor if a cell change condition is satisfied, wherein the measurement report indicates or comprises a request for changing a source small cell served by the source drift eNB to a target small cell served by a target drift eNB, and wherein after the cell change the UE is connected with the anchor base station and the target drift eNB.

8. The UE of claim 7, wherein the measurement configuration for UE measurements and reporting is based on at least one of a UE mobility, a UE user plane demand, a UE data bearer requirement, and a network loading of a macro cell layer.

9. The UE of claim 7, wherein the measurement configuration for UE measurements and reporting frequency is based on at least one of a UE speed, a UE location, a UE access class, a UE traffic type, a UE traffic status, and a UE received signal quality.

10. The UE of claim 7, wherein a handover is performed for cell change, wherein the UE receives an RRC reconfiguration request message from the anchor eNB, leaves the source cell and synchronizing with the target cell, and transmits an RRC reconfiguration complete message to the target drift eNB.

11. The UE of claim 7, wherein the cell change condition comprises the UE determines the target cell as a preferred cell within the same anchor.

12. The UE of claim 11, wherein the UE performs a drift eNB addition and removal procedure to change from the source small cell to the target small cell.

13. A method, comprising:
(a) receiving a measurement configuration by a user equipment (UE) served by an anchor eNB in a macro cell and a source drift eNB in a small cell;
(b) determining whether a target drift eNB is feasible for anchor-drift pairing;
(c) determining whether to perform an enhanced radio resource control (RRC) connection reestablishment procedure with the target drift eNB based on whether a measurement report is triggered or whether a condition for cell change within the same anchor is met; and
(d) transmitting an RRC connection reestablishment request to the target drift eNB, wherein the RRC reestablishment request comprises anchor eNB information containing a physical cell ID (PCI) and frequency of the anchor eNB so that the target drift eNB can recognize the anchor eNB for anchor-drift pairing.

14. The method of claim 13, further comprising:
obtaining a list of cells that is possible for anchor-drift pairing from the anchor base station through the measurement configuration.

15. The method of claim 13, further comprising:
obtaining from each drift base station that is capable for pairing with the anchor base station via broadcasting information.

16. The method of claim 13, wherein the determining in (c) further involves filtering based on UE mobility, UE user plane demand, UE data bearer requirement, or network loading of a macro cell layer.

17. The method of claim 13, wherein the reestablishment request further comprises legacy information including C-RNTI and shortMAC-I.

18. The method of claim 13, wherein a new reestablishment cause is used to inform the target cell that the enhanced reestablishment request is for cell change within the same anchor base station.

19. A user equipment (UE), comprising:
a receiver that receives a measurement configuration served by an anchor eNB in a macro cell and a source drift eNB in a small cell;
a mobility module that determines whether a target drift eNB is feasible for anchor-drift pairing, wherein the mobility module also determines whether to perform an enhanced radio resource control (RRC) connection reestablishment procedure with the target drift eNB based on whether a measurement report is triggered or whether a condition for cell change within the same anchor is met; and
a transmitter that transmits an RRC connection reestablishment request to the target drift eNB, wherein the RRC reestablishment request comprises anchor eNB information containing a physical cell ID (PCI) and frequency of the anchor eNB so that the target drift eNB can recognize the anchor eNB for anchor-drift pairing.

20. The UE of claim 19, wherein the UE obtains a list of cells that is possible for anchor-drift pairing from the anchor base station through the measurement configuration.

21. The UE of claim 19, wherein the UE obtains from each drift base station that is capable for pairing with the anchor base station via broadcasting information.

22. The UE of claim 19, wherein the UE determines whether to perform the reestablishment procedure based on UE mobility, UE user plane demand, UE data bearer requirement, or network loading of a macro cell layer.

23. The UE of claim 19, wherein the reestablishment request further comprises legacy information including C-RNTI and shortMAC-I.

24. The UE of claim 19, wherein a new reestablishment cause is used to inform the target cell that the enhanced reestablishment request is for cell change within the same anchor base station.

* * * * *